May 16, 1950 C. W. MOTT 2,507,733
POWER TRANSMITTING DEVICE
Filed Aug. 10, 1946 4 Sheets-Sheet 4

Inventor.
Carl W. Mott
By Paul O. Pippel
Atty.

Patented May 16, 1950

2,507,733

UNITED STATES PATENT OFFICE 2,507,733

POWER-TRANSMITTING DEVICE

Carl W. Mott, La Grange, Ill., assignor to International Harvester Company, a corporation of New Jersey Application August 10, 1946, Serial No. 689,771

4 Claims. (Cl. 74—25)

1

This invention has to do with multiple power train power transmitting devices and primarily concerns such devices of structural and operating characteristics adapting the same for use as a power-lift upon farm tractors and the like.

An important object of this invention is the provision of a power transmitting device having coaxial driving and driven parts together with clutch members also coaxial with the driving and driven parts, and one of the clutches being operable to directly connect the parts while the other thereof is operable for connecting said driving and driven parts through a novel counter-shaft type of reversing gearing.

Another object of the invention is the provision of helical spring-type friction clutches spaced axially of and about the driving part or shaft and having axially spaced brake members associated therewith and brakable for selectively engaging said clutches and thereby establishing the driving connections of the power trains of the device.

Still another object of the invention is the provision of a novel type of control apparatus by means of which either of the clutches of the device can be engaged for establishing its associated power train and by means of which the ensuing rotation of the driven part of the device is operable for incurring disconnection of the clutch and quiescence of the driven part when it has rotated an amount correlated with the amount of manual movement for incurring said movement of the driven part.

A further object is the provision of an improved mounting of a power-lift device over the body of a tractor for adapting the device to be driven from the tractor engine irrespective of whether power is being transmitted to traction wheels of the vehicle.

The above and other desirable objects inherent in and encompassed by the invention and numerous advantages thereof will become apparent from the ensuing description and annexed drawings, wherein:

Figure 3 is a vertical sectional view taken on

Figure 2:
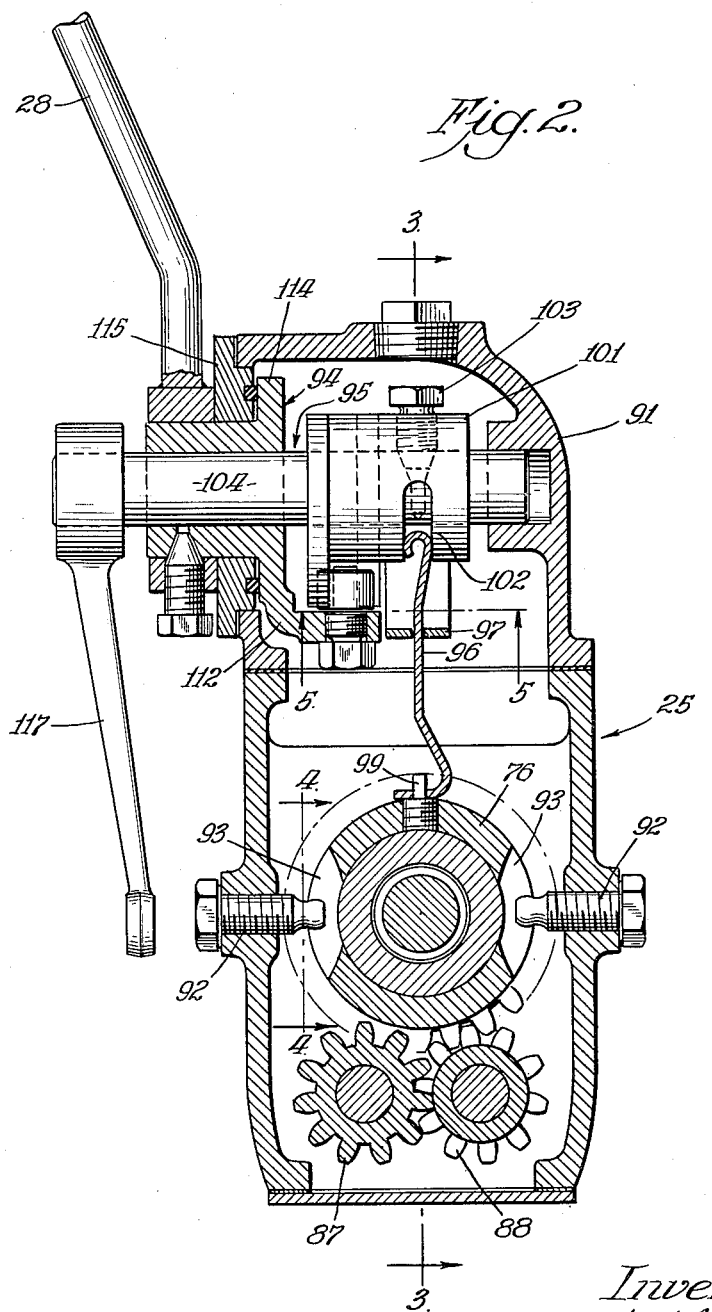
Figure 2 is a transverse sectional view of the device taken substantially at the vertical plane indicated by the line 2—2 in Figure 1.

2 a plane extending lengthwise of the device and as indicated by the line 3—3 of Figure 2.

Figure 4:
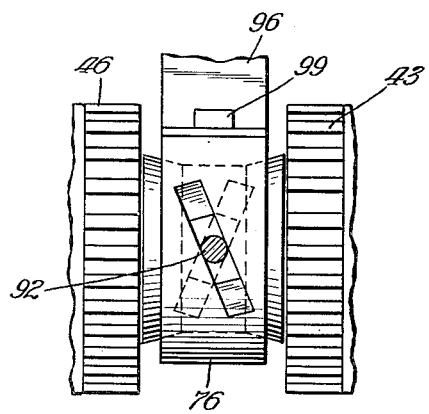

Figure 4 is a view taken on the line 4—4 of Figure 2, showing details of a clutch-engaging brake structure.

Figure 5:
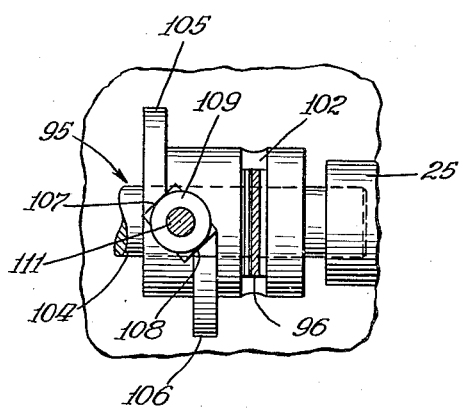

Figure 5 is a view taken on the line 5—5 of Figure 2, illustrating cam means employed in power train selecting apparatus of the device.

Figure 3:
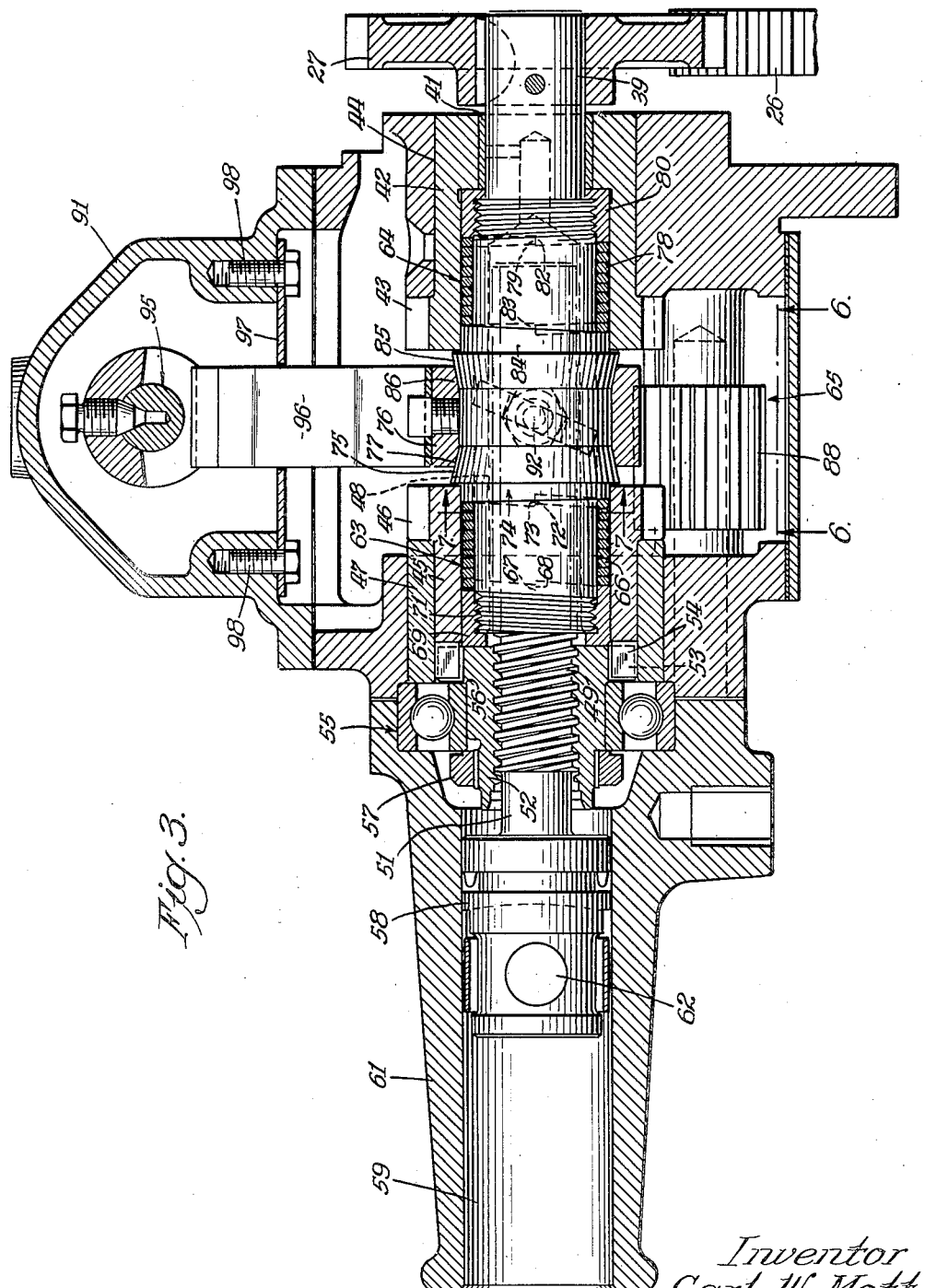
Figure 6:
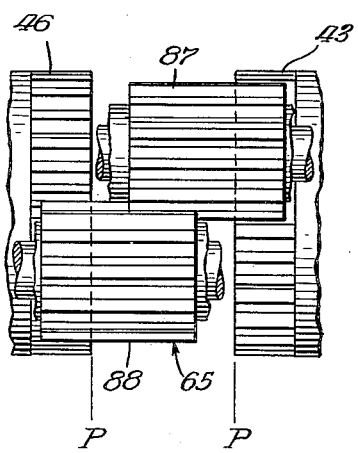

Figure 6 is a horizontal view looking upwardly as indicated by the line 6—6 in Figure 3, showing a novel reversing gear arrangement of the present device.

Figure 7:
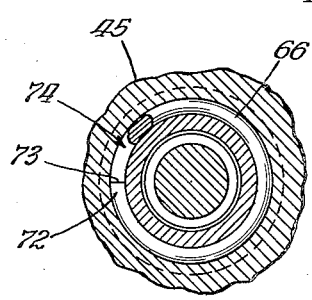

Figure 7 is a fragmentary sectional view taken on the line 7—7 of Figure 3, showing details of one of the helical spring type friction clutches of the device.

Figure 1:
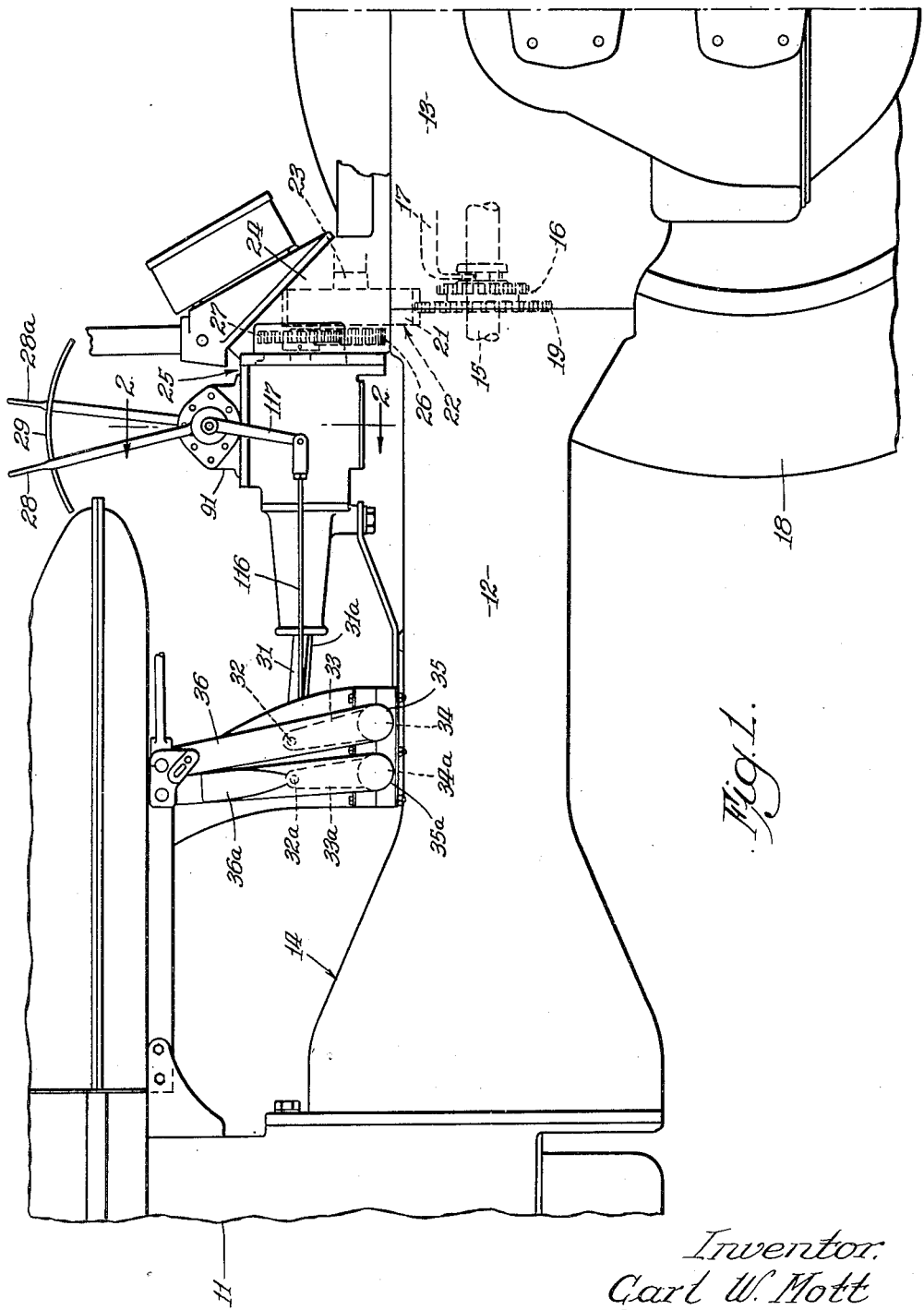
Figure 1 is a fragmentary side elevational view of a tractor, the nearest traction wheel of the same being removed, and a like view of a power transmission device constituting a preferred form of the invention mounted upon a tractor body where such device is serviceable as a power-lift.

Referring now to Figure 1, the tractor there shown has an engine 11 at its front end, a body 12 secured to and extending rearwardly from the engine and a change-speed gearing housing 13 connected to the rear end of the body 12. The front end of the body 12 which is hollow is enlarged at 14 for containing a conventional friction clutch (not shown) which is operable for establishing a disconnectable connection between the engine and a shaft 15 which is shown fragmentarily in the drawings. Shaft 15 in the present installation is the drive shaft for the gearing in the change-speed gearing compartment 13 and has splined thereto a change-speed transmission gear cluster 16. The gear cluster is manually shiftable through the agency of a shifter fork 17 from a neutral position wherein neither of the gears on the cluster is meshed with other gears of the transmission, whereby the shaft 15 is ineffective for transmitting power to traction wheels 18 of the vehicle, to a position where one of the gears will be effective for causing the transmission of power to the traction wheels.

A gear 19 of the cluster 16 is in mesh with teeth of a gear-like casing 21 of a flexible coupling device 22 journaled on a shaft 23 in a gear compartment 24 of a power-lift device casing 25. The casing 25 of the power transmitting device is mounted over the upper side of the tractor body 12 in such a position axially of the tractor that the toothed gear-like casing 21 will remain in mesh with the cluster gear 19 and irrespective of whether the cluster is in neutral position or in a position for establishing driving connections through the transmission gearing in the casing 13. A driven part of the flexible coupling device 22 includes a gear 26, Figures 1 and 3, which is disposed centrally of the tractor body 12 in a lateral sense for mutual meshing with the driving gears 27 of power transmission devices within casings 25 mounted side-by-side. Since the devices in the casings 25 are of virtually identical structure, only one of the devices is herein shown, excepting for a control lever 28a, Figure 1, of the other device.

Each of the power transmitting devices has a manually operated control lever adjustable along a quadrant 29. The control lever for the device illustrated in Figure 3 and of which the casing 25 is shown in Figure 1 is designated 28. The device herein illustrated also has a connecting rod 31 pivotally connected at 32 with an arm 33 of a rock shaft 34 oscillatable in a bearing 35 on the tractor body. The other device has an identical connecting rod 31a pivotally connected at 32a with an arm 33a for rocking a rock shaft 34a oscillatable in a bearing 35a adjacent to the bearing 35. Implement operating arms 36 and 36a are at opposite ends of the rock shafts 34 and 35a.

The gear 27 for driving the reversible power transmitting unit in the casing 25 is keyed to a shaft 39 which extends axially forwardly into said casing. A rear end portion of the shaft 39 adjacent to the gear 27 is journaled by means of a bushing 41 in a hub 42 and a gear 43 which is journaled at 44 in the casing 25. The forward end of the shaft 39 is rotatably supported in the hub 45 of a gear 46 which is journaled within an annular bearing member 47 supported by the casing.

Shaft 39 contains a cavity 48 extending axially thereinto from its forward end for telescopically receiving the threaded portion 49 of an endwise movable threaded member 51. An axially fixed but rotatable running nut 52 is constrained for rotation with the gear 46 by constantly meshing jaw clutch counterparts 53 and 54. The running nut 52 is rotatively carried by the inner race of a ball bearing unit 55 and is prevented from moving axially by a shoulder 56 on said nut and by a lock nut 57. Rotation of the gear 46 and hence of the threaded member 52 in either of opposite directions will cause endwise movement of threaded member 51 in correspondingly opposite directions. A headed portion 58 of the member 51 is of piston-like construction and slides within a cylindrical bore 59 of a casing extension 61. A cross pin 62 in the head 58 facilitates the pivotal connection thereto of the rear end of the connecting rod 31, Figure 1, so that the rock shaft 34 will be caused to rock coordinately with endwise movement of the threaded member 51.

Rotation of the gear 46 counter-clockwise, as viewed from the right or rear end of the device in Figure 3, is caused by the engagement of a clutch device 63 for connecting this gear for rotation in unison with the constantly rotating shaft 39. This counter-clockwise rotation of the gear 46 causes forward projection of the endwise movable threaded member 51. Clockwise rotation of the gear 46 for incurring rearwise endwise movement of the threaded member 51 is incurred by the engagement of a clutch 64 which is then effective for directly connecting the gear 43 with the shaft 39, whereby the gear 43 is effective through reversing gearing 65 for rotating the gear 46 clockwise. Therefore, selectively engaging the clutches 63 and 64 correspondingly selectively produces endwise movement of the threaded member 51. When neither of the clutches 63—64 is engaged the shaft 39 simply rotates idly and the pitch of the threaded structures 52 and 49 is sufficiently small that the structure 52 locks the threaded member 51 against endwise movement by virtue of any force applied endwise thereto through the connecting pin 62.

The clutches 63 and 64 are substantially alike. Clutch 63 comprises a helical spring 66 biased toward a contracted condition in which the radial outward sides of its coils are slightly spaced from the inner cylindrical periphery of the gear hub 45. One end 67 of the spring abuts against a shoulder 68 on an end of an internally threaded ring 69 turned onto a threaded end portion 71 of the shaft 39. Ring 69 rotates with the shaft 39 and because of the abutment of the shoulder 68 with the spring end 67, the spring is also caused to rotate with said shaft. The opposite end 72 of the clutch spring 66 abuts against a shoulder 73 of a friction brake member 74 which is journaled upon the shaft 39 and which has a conical friction surface 75. An endwise movable annular braking structure 76 has a conical friction surface 77 shiftable axially into frictional engagement with surface 75 for retarding rotation of the member 74 and of the end 72 of the helical spring element 66, whereby this element is caused to expand into frictional driving engagement with the inner periphery of the gear hub 45. The spring 66 automatically contracts for releasing the clutch when the retarding braking action between the surfaces 75 and 77 is terminated.

Clutch 64 comprises a helical spring element 78 with opposite ends 79 and 81. The end 79 abuts against a shoulder 82 of an annular threaded member 80 which is threaded onto and rotates with the shaft 39. Spring end 81 abuts against a shoulder 83 of a brake member 84 having a conical friction surface 85. Friction surface 85 is engaged by a friction surface 86 on the annular braking structure 76 when the latter is shifted axially rearwardly, whereby braking member 85 is retarded in the manner explained above with respect to the member 74 and the friction element 78 is expanded into frictional clutching engagement with the gear hub 42, whereby the gear 43 is caused to rotate with the constantly rotating shaft 39. The coils of the clutch element 78 successively contract so that this element releases from the gear hub 42 automatically when the retarding braking force is terminated between the friction surfaces 85 and 86.

The reversing gear train 65 is perhaps best illustrated in Figure 6. This gear train includes a pair of long gears 87 and 88. These idlers gears 87 and 88 are rotatably supported by the casing for rotation about axes parallel with that of the shaft 39 and spaced circumferentially of said shaft, whereby end portions of these gears lying between planes P defined by opposed end faces of the gears 43 and 46 are intermeshed and project oppositely from these intermeshed portions respectively into mesh with the axially spaced gears 43 and 46.

Means for selectively controlling the endwise movement of the annular braking structure 76 comprises elements within a superposed casing portion 91 and a pair of axially alined studs 92 anchored in opposite walls of the casing 25 in diametrical opposite relation with respect to the structure 76. These studs 92 have inner end portions projecting into respective diagonal grooves 93 formed in said structure 76 and for reacting against the sides of these grooves for camming the structure endwise responsively to rotation thereof. Rotation of the braking structure clockwise, as viewed in Figure 2, will cause forward movement of the structure and engagement of the friction surfaces 75 and 77 for engaging the clutch 63. A slight rotation of the structure 76 from the neutral position, shown in Figure 2, in a counter-clockwise direction will cause rearward movement of said structure and consequent engagement of the friction clutch 64.

A pair of concentric relatively rotatable control structures 94 and 95, Figures 2, 3 and 5, together with a lever 96 are for effecting rotative or oscillative movement of the braking structure or power train selector 76. The lever 96 is pivotable across a fulcrum member 97 which is mounted in the casing by means of bolts 98 shown in Figure 3. The lower end of the lever 96 is articulately connected with a stud 99 projecting radially from the braking structure 76, whereas the upper end of said lever is slidably and articulately associated with a part 101 which is constrained for rotation with the structure 95. Said upper end of the lever 96 is slidably associated with a circumferential configuration in the form of a groove 102 extending circumferentially of the part 101. A set screw 103 constrains the part 101 for rotation and axial movement with a rotatably and axially movable shaft 104 of the structure 95.

The part 101 also has a pair of circumferentially extending axially spaced ribs 105 and 106, Figure 5, having opposed diagonal camming end faces 107 and 108. These end faces 107 and 108 are spaced apart a distance substantially equal to the diameter of a cam follower in the form of a roller 109 journaled upon a stub shaft 111 anchored in an arm 112 of the rotatable structure 94.

Rotatable structure 94 is manually oscillatable by means of a hand operated control lever 28 which together with a flange 114 of the structure cooperates with a wall-opening closure member 115 for preventing endwise movement of said structure. Consequently, when the structure 94 is rotated from neutral position wherein the follower 109 is in the position illustrated in Figure 5, this follower will cooperate with one or the other of the cam faces 107—108 for moving the structure 95 endwise and thereby pivoting the lever 96 and rotating the power train selector 76 for incurring engagement of the selected one of the clutches 63 or 64. Pursuant to the ensuing endwise movement of the threaded member 51, the rock shaft 34 will be rocked and a mechanical control link 116, Figure 1, with which this rock shaft is operably connected, will be moved endwise for imparting movement to an arm 117, Figures 1 and 2, for rotating the structure 95 in the direction for reestablishing the neutral position of the cam follower between the cam faces 107 and 108 when said ensuing movement of the endwise movable threaded member 51 attains a distance predeterminedly correlated in amount and direction with the amount and direction of manual movement initially imparted to the control lever 28.

Having thus described a preferred embodiment of the invention with the view of clearly and concisely illustrating the same, I claim:

1. In a power transmitting device receivable of driving force from a continuously rotating driving member having a cavity extending axially inwardly from an end thereof, an endwise movable threaded member coaxial with said driving member and extending into said cavity and having a threaded portion projecting outwardly from said cavity, a rotatable threaded member having its threads meshed with those on the outward portion of the endwise movable member and rotatable oppositely to move said endwise movable member in respectively opposite directions, a pair of axially spaced gears rotatable coaxially of and about said driving member, the hub of each gear having an internal cylindrical clutching periphery, helical spring clutch elements about said driving member and each having one end driven thereby to cause said elements to turn with said member, said elements being respectively enveloped by said cylindrical peripheries and being expansible into frictional driving engagement respectively therewith when an unwinding twisting force is applied to their opposite ends, means drivingly connecting one of said gears with the rotatable threaded member, idler gears meshed with one another and respectively with said axially spaced coaxial gears to connect said coaxial gears for rotation in opposite directions, brake members circumscribing said driving member between the coaxial gears and respectively connected with said other ends of the spring clutch elements for rotation therewith and operable by retardation therewith to apply the force for expanding their associated clutches, and means for selectively retarding said circumscribing brake members.

2. In a power transmitting device receivable of driving force from a continuously rotating driving shaft having a cavity extending axially inwardly from an end thereof, an endwise movable threaded member coaxial with said shaft and having portions respectively inwardly and outwardly of the shaft cavity, a rotatable threaded member having its threads meshed with those on the outward portion of said endwise movable member and rotatable oppositely to cause movement of said endwise movable member in respectively opposite directions, a pair of axially spaced gears rotatable coaxially about said driving shaft and of which one is constrained for rotation in unison with said threaded member, means establishing a reversing driving connection between said gears, each gear having a cylindrical interior periphery defining an annular space about said shaft, helical spring clutch elements respectively in said annular spaces and having outward end portions driven by said shaft for causing such elements to rotate therewith, said helical elements being biased toward radial contraction out of engagement with their associated gear peripheries but being expandible by an unwrapping force applied to their opposite or opposed inner ends, friction brake members respectively associated with the inner ends of said helical elements for rotation thereby with said shaft but retardable relatively to said shaft incident to expanding their helical element to condition the same for establishing a driving connection between said shaft and the associated gear, a braking structure about said shaft between said brake members and adjustable selectively into braking engagement with said brake members to cause either gear to be clutched to said shaft.

3. The combination set forth in claim 2, wherein said braking structure comprises a braking ring carried by said shaft in a manner facilitating oscillative movement of the ring about the shaft axis and axial displacement of the ring in opposite directions from a neutral position wherein such ring is engaged with neither of said rotatable braking members, a force-resolving configuration extending axially of and circumferentially about said ring, and fixed means cooperable with said configuration to impart axial movement to the ring pursuant to its oscillative movement and in either direction in correlation with the direction of oscillative movement to provide for selective engagement thereof with said braking members to cause engagement of their associated of the clutches and hence connection of their associated of the gears with said shaft.

4. In a power transmitting device receivable of driving force from a continuously rotating driving member, power transmitting trains alternately drivable from said member when connected therewith, means including axially spaced brake members about said driving member and for respectively connecting said trains with said member when braking force is applied to said brake members, an annular braking structure disposed about the driving member between said brake members, said braking structure being oscillative about the axis of said driving member and movable axially thereof and having a force-resolving configuration extending circumferentially and axially thereof, means fixed relatively to said structure and cooperating with said configuration to impart axial motion to said structure when it is oscillated, the oscillative motion in one direction causing axial movement in one direction to apply braking force to one of the brake members whereas oscillative motion in the other direction causes axial movement of the structure oppositely to apply braking force to the other brake member, and means for oscillating said braking structure comprising a pair of control members concentrically rotatable about an axis transverse to that of the driving member, one of said control members having an axially movable part thereon rotatable therewith and having a circumferential configuration thereon, said part also having a pair of axially spaced circumferentially extending ribs having opposed diagonal camming end faces, a cam follower on the other of said concentric control members and projecting into the space between said cam faces to coact therewith in causing axial movement of said axially movable part in either direction according to the direction of relative rotation of said control members, and lever means cooperable with said circumferential configuration of said axially movable part for oscillating said brake structure in directions correlated with the direction of axial movement of said part.

CARL W. MOTT.

REFERENCES CITED

The following references are of record in the file of this patent:

UNITED STATES PATENTS

| Number | Name | Date |
|---|---|---|
| 1,519,316 | Larsh | Dec. 6, 1924 |
| 1,523,542 | Jones | Jan. 20, 1925 |
| 1,768,859 | Petrelli | July 1, 1930 |
| 2,283,476 | Waibel | May 19, 1942 |
| 2,306,767 | Wagner | Dec. 29, 1942 |
| 2,307,317 | Konig | Jan. 5, 1943 |
| 2,352,270 | Land et al. | June 27, 1944 |
| 2,388,043 | Derungs | Oct. 30, 1945 |
| 2,405,699 | Kesterton | Aug. 13, 1946 |